United States Patent
Hoffman et al.

(10) Patent No.: US 11,449,388 B1
(45) Date of Patent: Sep. 20, 2022

(54) SYNTHESIZED NETWORK BLOCK DEVICES FOR RECOVERY OF IMAGE BACKUPS

(71) Applicant: eFolder Inc., Denver, CO (US)

(72) Inventors: Kevin John Hoffman, Denver, CO (US); Nikolay Stanislavovich Semchenkov, Smolensk (RU); Konstantin Sergeevich Germanov, Moscow (RU); Artem Robertovich Khvoshch, Smolensk (RU)

(73) Assignee: eFolder Inc., Denver, CO (US)

( * ) Notice: Subject to any disclaimer, the term of this patent is extended or adjusted under 35 U.S.C. 154(b) by 0 days.

(21) Appl. No.: 17/456,514

(22) Filed: Nov. 24, 2021

(51) Int. Cl.
*G06F 11/00* (2006.01)
*G06F 11/14* (2006.01)
*G06F 3/06* (2006.01)

(52) U.S. Cl.
CPC ........ *G06F 11/1435* (2013.01); *G06F 3/0619* (2013.01); *G06F 3/0644* (2013.01); *G06F 3/0659* (2013.01); *G06F 3/0664* (2013.01); *G06F 3/0683* (2013.01); *G06F 11/1451* (2013.01); *G06F 11/1469* (2013.01)

(58) Field of Classification Search
CPC ............. G06F 11/1435; G06F 11/1451; G06F 11/1469; G06F 11/1458; G06F 3/0619; G06F 3/0644; G06F 3/0659; G06F 3/0664
See application file for complete search history.

(56) References Cited

U.S. PATENT DOCUMENTS

| | | | |
|---|---|---|---|
| 8,589,350 B1 | 11/2013 | Lalonde et al. | |
| 9,213,607 B2 | 12/2015 | Lalonde et al. | |
| 9,785,647 B1 | 10/2017 | Petri et al. | |
| 10,061,660 B1 * | 8/2018 | Jagannatha | G06F 11/1464 |
| 10,078,525 B2 | 9/2018 | Bushman et al. | |
| 11,068,353 B1 * | 7/2021 | Ved | G06F 9/45558 |

(Continued)

OTHER PUBLICATIONS

Acronis Cyber Protect 15, "Running a virtual machine from a backup (Instant Restore)," Retrieved at https://www.acronis.com/en-us/support/documentation/AcronisCyberProtect_15/index.html#38848.html, Retrieved on Oct. 1, 2021, pp. 1-2.

(Continued)

*Primary Examiner* — Philip Guyton
(74) *Attorney, Agent, or Firm* — Invoke

(57) ABSTRACT

In an embodiment, a computing system may restore data for a protected system using an emulated block device that presents a synthesized filesystem. Initially, a request to restore data for the protected system may be received. The request may include or otherwise indicate a particular file system format, a particular virtual disk format, and a recovery point representing a particular point in time for presentation of the restored data. Responsive and subsequent to receiving the request to restore the data, the computing system generates a first configuration of the emulated block device for presenting the synthesized filesystem, the first configuration being based on: a) an amount of data in the recovery point, b) the particular file system format, and c) the particular virtual disk format. The computing system also generates a configuration for the synthesized filesystem, and provides access to the emulated block device based on the determined configurations.

21 Claims, 5 Drawing Sheets

(56) References Cited

U.S. PATENT DOCUMENTS

| | | | | |
|---|---|---|---|---|
| 2011/0106764 | A1* | 5/2011 | Wu | G06F 11/1469 707/639 |
| 2011/0196842 | A1* | 8/2011 | Tl | G06F 11/1469 707/679 |
| 2016/0110262 | A1* | 4/2016 | Nanivadekar | G06F 13/4282 707/654 |
| 2019/0179714 | A1* | 6/2019 | Karthikeyan | G06F 3/067 |
| 2020/0272544 | A1* | 8/2020 | Carvelli | G06F 16/907 |

OTHER PUBLICATIONS

Arcserve, "SPX VirtualBoot," Retrieved at https://support.storagecraft.com/s/article/using-virtualboot?language=en_US, Retrieved on Oct. 20, 2021, pp. 1-25.

Axcient, "x360Recover Direct-to-Cloud is Here," Retrieved at https://axcient.com/solutions/axcient-direct-to-cloud/, Retrieved on Nov. 24, 2021, pp. 1-6.

Datto, "SIRIS, ALTO, and NAS: Connecting a SIRIS to a Hyper-V Hypervisor," Retrieved at https://help.datto.com/s/article/KB115002506783, Retrieved on Sep. 15, 2021, pp. 1-12.

Datto, "SIRIS, ALTO, and NAS: Virtualize via Hypervisor for VMware environments," Retrieved at https://help.datto.com/s/article/KB204897234, Retrieved at Sep. 14, 2021, pp. 1-6.

Storagecraft, "StorageCraft VirtualBoot technology," Retrieved at https://www.storagecraft.com/products/virtualboot, Retrieved on Nov. 11, 2021, pp. 1-8.

Tami Sutcliffe, "Recovery Center—x360Recover," Retrieved at https://help.axcient.com/001-components-of-direct-to-cloud/recovery-center, Retrieved on Nov. 16, 2021, pp. 1-18.

Tami Sutcliffe, "Sep. 10, 2021—Recovery Center 1.2.0—Release Notes," Retrieved at https://help.axcient.com/2021-release-notes-x360recover-by-component/recovery-center-120-release-notes-x360recover-d2c, Retrieved on Oct. 26, 2021, pp. 1-3.

Tami Sutcliffe, "Virtual disk export—x360Recover D2C—Recovery Center," Retrieved at https://help.axcient.com/001-components-of-direct-to-cloud/1052460-virtual-disk-export-x360recover-d2c, Retrieved on Nov. 23, 2021, pp. 1-11.

Veeam, "Before You Begin," Retrieved at https://helpcenter.veeam.com/docs/backup/hyperv/instant_recovery_to_vmware_byb_hv.html?ver=110, Retrieved on Nov. 16, 2021, p. 1.

Veeam, "Veeam vPower NFS Service," Retrieved at https://helpcenter.veeam.com/archive/backup/100/vsphere/vpower_nfs_service.html, Retrieved on Jun. 16, 2021, pp. 1-2.

Veritas, "NetBackup 7.6 Feature Briefing Instant Recovery for VMware," Retrieved at https://www.veritas.com/content/support/en_US/doc/ka8j0000000CtKmAAK, Retrieved on Aug. 2, 2013, pp. 1-9.

VMware, "NFS Protocols and ESXi," Retrieved at https://docs.vmware.com/en/VMware-vSphere/7.0/com.vmware.vsphere.storage.doc/GUID-8A929FE4-1207-4CC5-A086-7016D73C328F.html, Retrieved on Feb. 16, 2021, pp. 1-3.

\* cited by examiner

SYNTHESIZED NETWORK BLOCK DEVICES FOR RECOVERY OF IMAGE BACKUPS

TECHNICAL FIELD

The disclosure generally relates to data backup systems, and more particularly to restoring backup data using synthesized block devices for virtualizing an image of the backup data.

BACKGROUND

Data backup systems are configured to store data of a reference system so that should data on the reference system become corrupted, changed without authorization, deleted, locked, or otherwise rendered unacceptable, the data for the reference system may be at least partially replaced using the backup data. A data backup system may copy all of the data of the reference system to create the backup file or an initial backup image of the reference system may be created, and then subsequent backups may store only data which has changed between a previous backup and the current state of the data of the reference system. Full copy strategies that store a full copy of the data of the reference system during every backup operation are both inefficient and costly in terms of system resources.

Some backup technologies perform data backup at the file level, capturing data individually for each file. This allows for the recovery of data at the file level, but does not allow for easy or fast recovery of the entire system. Users must reinstall the operating system first (and part of that process would recreate the filesystems beneath the operating system), and then restore the files from the backup. This process is long, cumbersome, and error-prone. As a result, image backups are used in some backup technologies to capture data blocks representing the entire filesystem of a given system, which makes it much easier to recover a system after a failure. Rather than having to reinstall an operating system, the entire system can be restored to a "bare metal" system.

Another restore technique "instantly" (within a few minutes) virtualizes a recovery point in an image backup using a hypervisor so that the backed-up system can be "booted" as a guest virtual machine running on the hypervisor.

BRIEF DESCRIPTION OF THE DRAWINGS

Reference symbols in the various drawings that have the same number indicate like elements.

DETAILED DESCRIPTION

Figure 1:
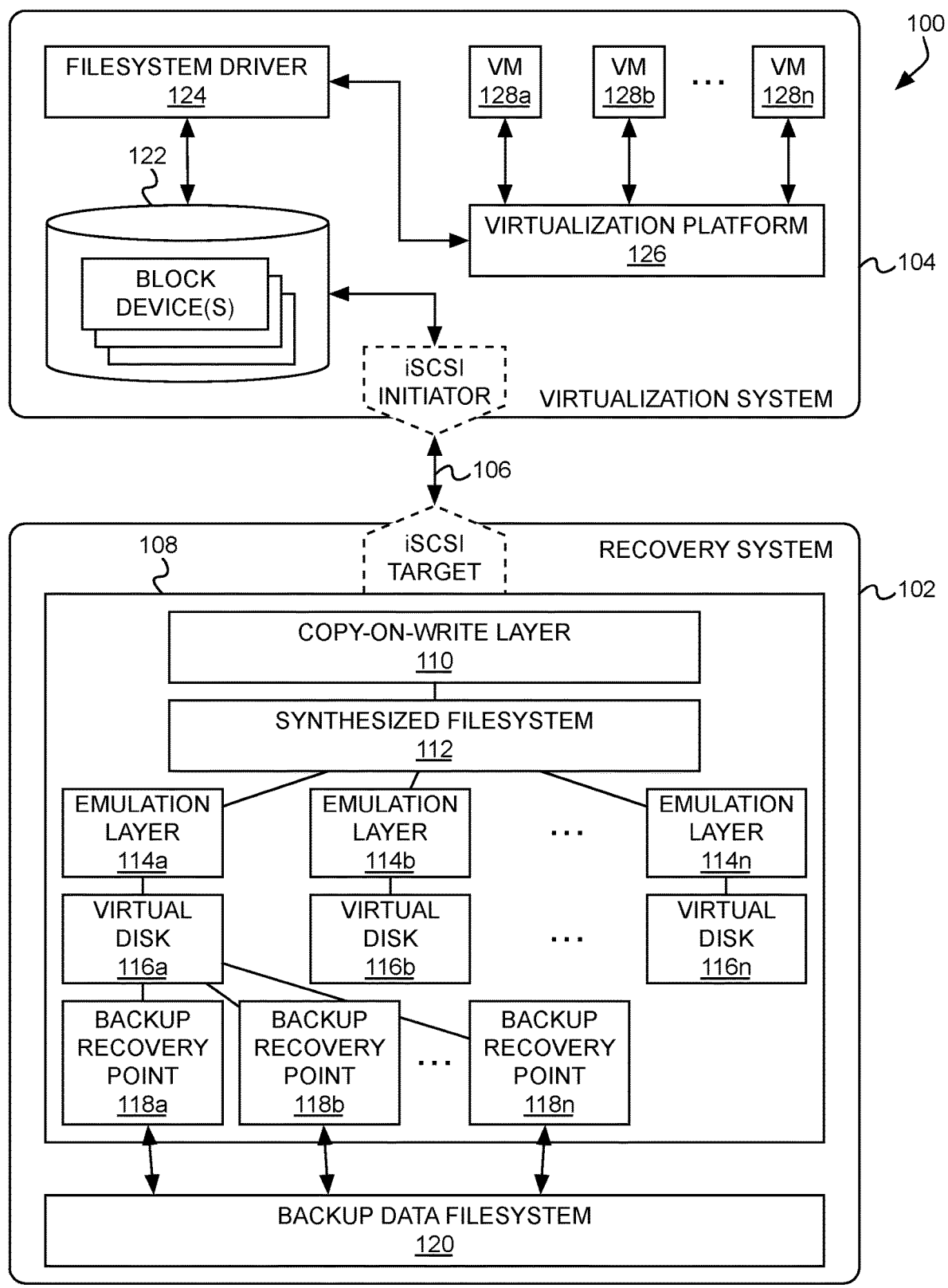
FIG. 1 is a simplified block diagram of an example system for providing a real-time synthesized filesystem.

In the following descriptions, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. VIRTUALIZING AN IMAGE BACKUP
2.1 CONVENTIONAL BACKUP APPROACHES
2.2 FAILING BACK
2.3 REAL-TIME SYNTHESIZED FILESYSTEM
3. ARCHITECTURES FOR NATIVE ACCESS TO BACKUP DATA
3.1 STUB FILE/PLUG-IN APPROACH
3.2 VIRTUAL FILESYSTEM APPROACH
3.3 VIRTUAL BLOCK DEVICE WITH PASS-THROUGH DISKS APPROACH
3.4 CUSTOM iSCSI TARGET WITH PASSTHROUGH DISKS APPROACH
3.5 CUSTOM iSCSI TARGET HAVING A SYNTHESIZED FILESYSTEM APPROACH
4. EXAMPLE EMBODIMENTS
4.1 INITIATING A RESTORE OPERATION
4.2 PROVIDING DATA TO A SYSTEM USING AN EMULATED BLOCK DEVICE
4.3 LOCAL VIRTUALIZATION WITH FAILBACK TO LOCAL PRODUCTION
4.4 HYPER-V FAILBACK APPROACH
4.5 VMWARE FAILBACK APPROACH
5. MISCELLANEOUS; EXTENSIONS
6. HARDWARE OVERVIEW
7. COMPUTER NETWORKS AND CLOUD NETWORKS

1. General Overview

The descriptions presented herein relay sufficient information to enable a person having ordinary skill in the art to make and use the present invention and are provided in the context and requirements of particular embodiments of the present invention.

One or more embodiments describe a computing system configured to restore data for a protected system. The computing system generates an emulated block device that presents a synthesized filesystem to present the requested data. Initially, a request to restore data for the protected system may be received. The request may include or otherwise indicate a particular file system format, a particular virtual disk format, and a recovery point representing a particular point in time for presentation of the restored data. Responsive and subsequent to receiving the request to restore the data, the computing system generates a first configuration of the emulated block device for presenting the synthesized filesystem, the first configuration being based on: a) an amount of data in the recovery point, b) the particular file system format, and c) the particular virtual disk format. The computing system also generates a configuration for the synthesized filesystem, and provides access to the emulated block device based on the determined configurations.

In an embodiment, the computing system may receive a request to read data from the emulated block device. Data to be read from the emulated block device will include one or more data blocks. In response to receiving the read request, the computing system checks a first mapping to determine whether a first data block of the requested data is located in the emulated block device. This first mapping describes relationships between a set of user data blocks of the emulated block device and memory sections that include filesystem metadata describing the user data blocks. Responsive to determining that the first data block is located in the emulated block device, the computing system checks a second mapping to determine a location of the first data block stored in the emulated block device. The second mapping describes relationships between a second portion of blocks of the emulated block device and corresponding transformations for converting data in the second portion of blocks into the first data block. Moreover, the second mapping provides a third configuration for presentation of the first data block stored in the emulated block device. The computing system then provides the first data block (and subsequently all portions of the requested data) in accordance with the third configuration and one or more corresponding transformations.

Details of particular embodiments are provided with respect to the various drawings and the descriptions below. Other enhancements, features, details, and/or advantages of the particular embodiments may be ascertainable by those of skill in the art upon reading the present descriptions and viewing the drawings.

Also, the particular embodiments described herein may be implemented in any computing system environment known in the art, which may include one or more processors and a computer-readable medium configured to store logic, the logic being implemented with and/or executable by the one or more processors to cause the one or more processors to perform operations specified by the logic.

It is also noted that various modifications to the disclosed embodiments will be readily apparent to a person having ordinary skill in the art and the general principles defined herein may be applied to other embodiments and applications without departing from the spirit and scope of the present invention. Thus, the present invention is not intended to be limited to the embodiments shown and described herein, but is to be accorded the widest scope consistent with the principles and features disclosed herein.

Also, unless otherwise specifically defined herein, all terms are to be given their broadest possible interpretation including meanings implied from the specification as well as meanings understood by a person having ordinary skill in the art and/or as defined in dictionaries, treatises, etc.

Moreover, the term "about" when used herein to modify a value indicates a range that includes the value and less and greater than the value within a reasonable range. In the absence of any other indication, this reasonable range is plus and minus 10% of the value. For example, "about 10 milliseconds" indicates 10 ms±1 ms, such that the range includes all values in a range including 9 ms up to and including 11 ms.

In addition, the term "comprise" indicates an inclusive list of those elements specifically described without exclusion of any other elements. For example, "a list comprises red and green" indicates that the list includes, but is not limited to, red and green. Therefore, the list may also include other colors not specifically described.

2. Virtualizing an Image Backup

2.1 Conventional Backup Approaches

Conventional systems have used various approaches to virtualize an image backup within a hypervisor or virtual layer architecture. Some of these approaches are described here, along with descriptions of the shortcomings in these approaches.

One approach provides a network file system that appears to the requesting system like a network file share that appears to include files in a native hypervisor format. Using this network file system, the hypervisor may boot a virtual machine (VM) that appears to include the network file share.

This approach suffers because network file share protocols supported by most hypervisors are platform specific, and will only function with the supported hypervisor brand or type. For example, Network File System (NFS) is supported for use in hypervisors provided by VMware, but not in other hypervisor environments. In another example, Server Message Block (SMB) is supported for hypervisors provided by Hyper-V, but not in other hypervisor environments, etc. Therefore, backup vendors will often only provide support for one type of hypervisor and use a different approach for other hypervisors. This leads to greater complexity and different recovery procedures based on the type of hypervisor. Hypervisors may also have a reduced feature set for VMs whose storage is backed by a network file share (e.g., NFS) as compared to what it believes is native storage. For example, it may not support live migration for a VM whose virtual disks are stored on a network filesystem (e.g., NFS) rather than a native cluster-aware hypervisor filesystem, e.g., Virtual Machine Filesystem (VMFS).

Another approach has a network server provide block devices over a standard network block device protocol—e.g., Internet Small Computer Systems Interface (iSCSI)—and have the hypervisor passthrough (provide without modification) these block devices to a guest VM, using raw device mappings or passthrough disks. However, this approach suffers because VMs that have raw device mappings or passthrough disks are limited in their functionality. For example, hypervisors are unable to take snapshots of such VMs, perform host-level backups, or perform live host or storage migration of the VM within a VM cluster. This lack of live migration also means that a separate manual process must be followed to get the VM back to a production environment.

According to another approach, custom "plugins" for hypervisors are installed, where the functionality of the hypervisor itself or the operating system supporting the hypervisor is modified, so that the image backup is able to be booted as a VM. However, these plugins require installing custom software onto the hypervisors, which may be disruptive (they may require the hypervisor to reboot before the plugins are active), may only work with certain versions of the hypervisor (further limiting the ability to upgrade the hypervisor version, or forcing unwanted upgrades of older versions), and may increase overall maintenance work (additional software that has to be kept up to date by the user, and which is prone to breaking in unexpected ways, so the overall system is more complex and harder to troubleshoot). Often, plugins take the form of a device driver or kernel module which may also potentially slow overall performance of the hypervisor, or even cause the hypervisor to crash.

Another approach combines the hypervisor itself and the image backup storage into a turn-key backup system (e.g., a "backup appliance"), where the hypervisor and/or operating system is modified to "adapt" the image backup data into a format that the hypervisor is configured to use to virtualize the backup and boot it as a VM. This approach requires a separate dedicated system for managing backups (the backup appliance), and is thus costly for smaller businesses. For larger businesses, the backup appliance may not integrate with the hypervisor clusters/resources they have already established. This approach only works with the type of hypervisor built into the backup system itself, and thus it may be challenging to transition the virtualized backup for use with the production environment running the production hypervisor when they are of different types, including shutting down the VM running on the backup hypervisor to restore the backup for use in the production environment. This results in downtime, eliminating the possibility of live migration when restoring a backup.

Yet another approach performs a full conversion of the image backup data to the hypervisor system, copying every data block in the backup to the destination hypervisor system in whatever storage format is preferred by that hypervisor system. This data copying process may be incredibly time consuming, taking hours, days, or even weeks to complete based on the size of the original system that was backed up.

2.2 Failing Back

After backup data has been created for a production environment, an event may occur which triggers the need to restore this backup data, for example by constructing and running a virtual machine from the backup data ("virtualized backups"). The triggering event may be a result of disaster, corruption, hacking, power interruption, etc. Failing back is the process by which the systems and data of the virtualized backups are restored back to the original production environment after the triggering event.

Typically, failing back locally to a production environment after virtualizing backups locally or in the cloud is a high-risk, time-intensive process that requires a lot of downtime for the user. Also, the user is charged with taking a last backup, then exporting or downloading all of the data for the last recovery point, then performing a bare-metal restore or to convert and copy the data back to the production virtualization environment.

Another approach for providing data backup is to use a dedicated appliance, such as a backup and disaster recovery (BDR) appliance, to provide the backup recovery services. To a lesser degree, failing back after performing a production virtualization on a BDR appliance also involves risk and downtime. In this scenario, the user is charged with stopping the failover VM and performing the bare-metal restore or exporting data in a format and/or using a protocol specific to those employed in the production environment.

In a non-hardware BDR scenario, a managed service provider (MSP) or some other entity managing and delivering services on-demand, such as an information technology (IT) administrator, may want to be able to use local storage to store an extra copy of their backup data locally. Once this local backup data is created, the MSP may virtualize any recovery point for the production system using data from the local copy of backed up data. However, once the backups are virtualized in this way, the MSP experiences the same failback issues that are described in the two scenarios above.

2.3 Real-Time Synthesized Filesystem

FIG. 1 shows an example system 100 for providing a real-time synthesized filesystem 112 that overcomes all of the issues described previously. System 100 includes a recovery system 102 and a virtualization system 104. Recovery system 102 is configured as a series of layers above a filesystem 120 that stores data for backup recovery points for a reference system. Recovery system 102, in an approach, includes an iSCSI target server 108, or some other type of server that is configured to communicate with virtualization system 104 via network connection 106.

Backup data filesystem 120 may include any type of storage media, such as hard disk, random access memory (RAM), non-volatile RAM (NVRAM), etc. Moreover, backup data filesystem 120 may be implemented as any combination of local storage, remote storage, network storage, cloud storage, etc.

Figure 2:
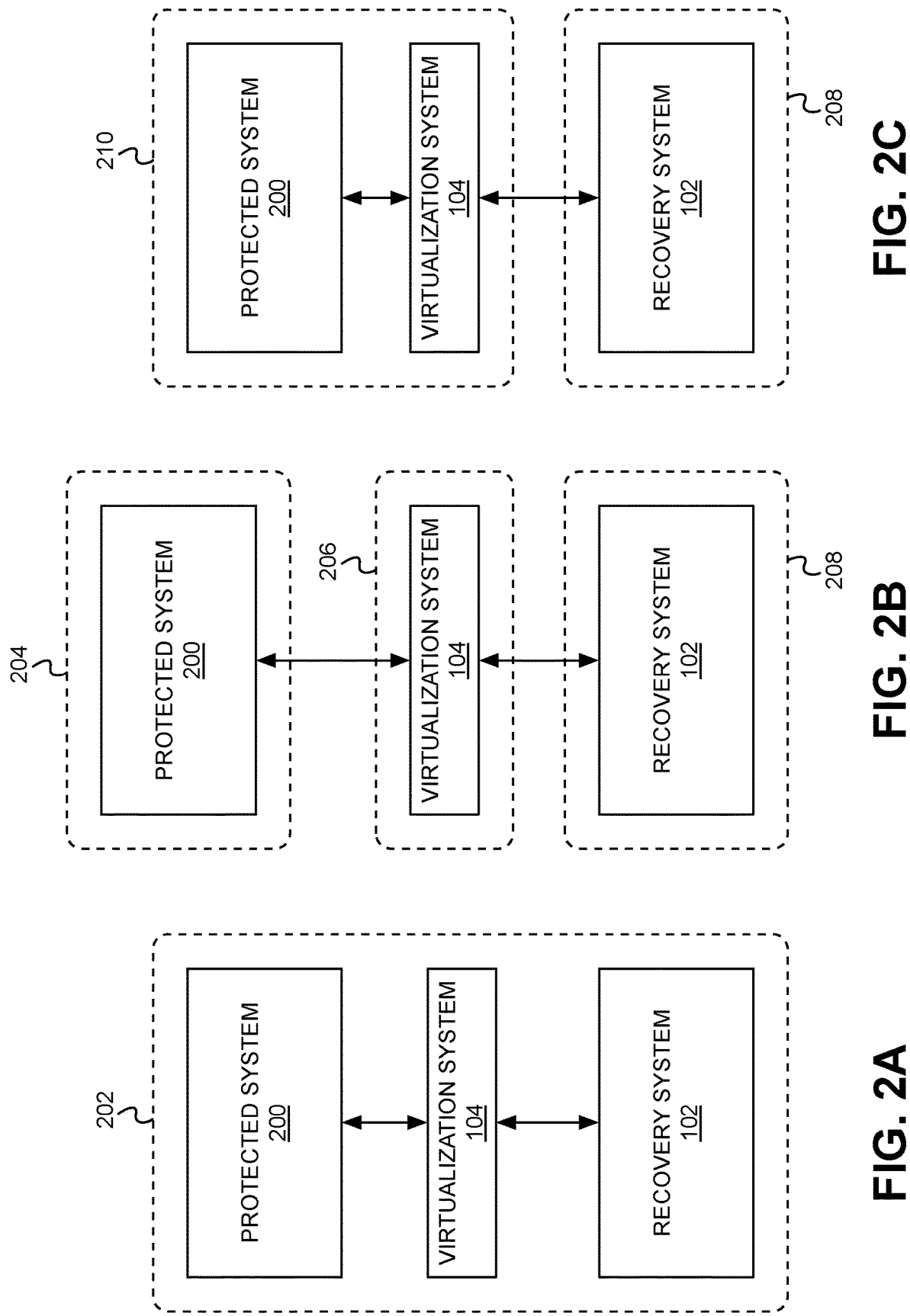
FIGS. 2A-2C shows example configurations for a recovery system.

FIGS. 2A-2C shows example configurations for recovery system 102, virtualization system 104, and a system for which the backup data is generated and provided (referred to herein as the "protected system"). In FIG. 2A, protected system 200, virtualization system 104, and recovery system 102 are all located at a common location 202, with virtualization system 104 in logical (e.g., inter-process) or electrical communication with recovery system 102 and protected system 200. A single hardware installation may comprise all three systems, or each system may be installed on separate hardware, with a network interconnecting the systems. In FIG. 2B, protected system 200 is installed at a first location 204, virtualization system 104 is installed at a second location 206, recovery system 102 is installed at a third location 208. In other words, all three systems are separate hardware installations that share no physical resources with one another. In this embodiment, recovery system 102 may be located remotely from protected system 200, remotely from virtualization system 104, or remote from both systems. In FIG. 2C, protected system 210 and virtualization system 104 are installed at a first location 210, while recovery system 102 is installed at a second location 208. Another configuration is partially shown in FIG. 1, where virtualization system 104 and recovery system 102 are included in system 100 at a first location, while protected system may be located at a second location remote from system 100.

In any of these configurations, certain protections may be in place to ensure that recovery system 102 is unaffected by power outages, catastrophic events, etc., that may affect other operations of protected system 200 and/or virtualization system 104.

With continued reference to FIG. 1, a highest layer of recovery system 102, in one approach, is an optional copy-on-write layer 110. Other approaches may not utilize a copy-on-write layer 110, leaving synthesized filesystem 112 as the highest layer accessible to virtualization system 104. Copy-on-write layer 110 is configured to provide one or more block device(s) via a network connection 106 configured for a block device network protocol. For example, iSCSI, network block device (NBD), or some other suitable interface that is widely supported by current virtualization platforms (e.g., VMware, Hyper-V, KVM, Xen, etc.) may be used to exchange block device data between recovery system 102 and virtualization system 104. Block data is presented in such a way that makes it universal across all virtualization platforms and provides for the same recovery process when using any type(s) of virtualization platform.

Synthesized filesystem 112 is a data architecture that is configured to appear as a preferred, native format for whatever type(s) of virtualization platform(s) 126 are being used by virtualization system 104. For example, synthesized filesystem 112 may be configured as an NT Filesystem (NTFS) when virtualization system 104 comprises a Hyper-V virtualization platform 126. In another example, synthesized filesystem 112 may be configured as a Virtual Machine Filesystem (VMFS) when virtualization system 104 comprises a VMWare virtualization platform 126. Regardless of how the data architecture is formed for synthesized filesystem 112, it will include files in the virtualization platform's 126 preferred file format for VM files (e.g., Virtual Machine Disk (VMDK) for VMware, Virtual Hard Disk (VHD) and/or Second Generation Virtual Hard Disk (VHDX) for Hyper-V, etc.). From the perspective of the virtualization platform 126, this synthesized filesystem 112 is "fully featured" and supports all of the native features of the virtualization platform 126. In other words, it looks and behaves exactly like a production data store, so the full feature set of the virtualization platform 126 may be used.

Below synthesized filesystem 112 is positioned an emulation layer 114 (e.g., emulation layer 114a, emulation layer 114b, . . . , emulation layer 114n). Each emulation layer 114 may utilize any open source or proprietary technology, format, and/or protocol to translate data stored below an emulation layer 114 into data for use in synthesized filesystem 112. In several embodiments, emulation layer 114 may translate data into native virtual machine disk file formats static or dynamic VMDK, static or dynamic VHD/VHDX, static or dynamic VDI, static or dynamic QCOW2, etc. Moreover, one or more virtual disks in virtual disk layer 116 may have data translated therefrom by an emulation layer 114, on a one-to-one basis or on a multiple-to-one basis.

Recovery system 102 may include multiple layers of "data virtualization," "synthesizing," and/or "on-the-fly conversion" between the image backup data such that it is suitable for use by unmodified virtual platform(s) 126 on virtualization system 104. The image backup data may be stored to backup data filesystem 120 as recovery points in native and/or proprietary formats for the protected system. A desired recovery point of the protected system may be accessed through backup recovery point block translation layer 118 (e.g., backup recovery point block translation layer 118a, backup recovery point block translation layer 118b, . . . , backup recovery point block translation layer 118n), which are responsible for providing on-the-fly, instantaneous, or near instantaneous (e.g., within less than 100 milliseconds) translation of data from backup data filesystem 120 in native and/or proprietary image backup formats into a sequence of blocks representing the original blocks of data for volumes of the protected system. The "data virtualization" layers of recovery system 102 may include, but are not limited to: (1) backup recovery point block translation layer 118, (2) virtual disk layer 116 (e.g., virtual disk 116a, virtual disk 116b, . . . , virtual disk 116n) to provide on-the-fly synthesizing of a virtual disk device, including a partition table and other expected virtual disk metadata, using data from one or more volumes provided by one or more backup recovery point block transaction layers 118, (3) emulation layer 114 (e.g., emulation layer 114a, emulation layer 114b, . . . , emulation layer 114n) that provide on-the-fly, instantaneous, or near-instantaneous translation of data from a sequence of blocks representing a virtual disk device into blocks of data representing a virtual machine virtual disk file in a desired format (e.g., VMDK, VHDX, etc.), and (4) a synthesized filesystem layer to provide on-the-fly synthesizing of a block device having a partition table and filesystem in a native virtual platform format (e.g., NTFS, VMFS, etc.), referred to as a "synthesized filesystem" 112, that includes files that contain the data from any requested recovery point(s), as exposed by the block device translation layer 118, after undergoing translation into one or more virtual disks by the virtual disk layer 116 and after undergoing translation to a specified virtual machine file format by emulation layer 114.

One or more backup recovery point block translation layers 118 may be translated by a single virtual disk in virtual disk layer 116 (as shown, virtual disk 116a translated data from backup recovery point translation layers 118a, 118b, . . . , 118n), with each virtual disk (e.g., virtual disk 116b, . . . , virtual disk 116n) also translating data from other backup recovery point block translation layers 118 (not shown).

Copy-on-write layer 110 provides the ability to make changes to the block data in target server 108. In an embodiment, synthesized filesystem 112 and all layers below it are configured as read-only. Copy-on-write layer 110 itself does not handle or manage block device network protocols, such as iSCSI. Instead, one or more block device network protocols (e.g., iSCSI) may be handled by target server 108 that is customized to handle the specific network block protocol, e.g., a custom iSCSI target server. Copy-on-write layer 110 just provides a layer of abstraction for the block device, which the target server 108 takes and exposes via the specified block device network protocol.

Virtualization system 104 includes at least one virtualization platform 126, such as a hypervisor or some other virtual machine monitor (VMM), in an embodiment. Virtualization platform 126 is configured to host one or more virtual machines (VMs) 128, e.g., VM 128a, VM 128b, . . . , VM 128n, each VM 128 being configurable to emulate a physical computing device to perform one or more tasks, processes, applications, etc. Virtualization system 104 includes a computer readable storage medium 122, which may store one or more block devices for storing user data and/or production system data. The computer readable storage medium 122 is accessed by virtualization platform 126 via a filesystem driver 124.

In one embodiment, virtualization system 104 may operate as part of the reference system for which the recovery point data has been gathered, for recovery of the reference system and/or use in other capacity by authorized user(s).

System 100 overcomes many of the limitations for providing synthesized filesystems described herein using other techniques. For example, system 100 does not install any plugins or perform any modification of virtualization system 104, filesystem driver 124, or virtualization platform 126. In addition, system 100 does not use a dedicated backup system that is configured to only operate with a specific hypervisor included when the backup system is purchased and/or acquired.

System 100 is configured to work with standard, unmodified, and/or vendor-supplied virtualization platforms (e.g., hypervisors) that may pre-exist the recovery system 102 and/or be installed remotely from the recovery system 102. This allows a user to make use of all the resources of an existing production virtual environment and any hypervisors thereof, without laborious modifications. Using these existing hypervisors, system 100 may recover image backups as VMs in real time.

System 100 avoids the use of passthrough disks or raw device mappings to guest VMs, which means that "live migration" capabilities of the existing hypervisors is still possible. This means that when a user is ready to migrate the backup data presented in a VM back to the production environment, native features of the hypervisor/VMM that allows for a "live migration" of data therein from the VM to the production environment may be utilized with no downtime.

System 100 does not require that the backup data get copied or a lengthy data conversion process, so that the recovery process is able to take place very quickly (within 5, 10, 15, 30 seconds, or less than a minute at the most). Also, time needed for the recovery process to complete is independent of how much data is being recovered (e.g., the size of the data). For example, a time to complete a boot process for the VM will be the same regardless of whether the recovery point backup data includes 100 GB, 500 GB, 1 TB, 10 TB, or even more.

According to one embodiment, system 100 may use management protocols to automatically configure the virtualization platform 126 to connect to block storage 122 on the provided network service, mount such storage using filesystem driver 124, and configure VMs 128 to use virtual machine disk files on the mounted filesystem provided by filesystem driver 124 mounted on that block storage 122. Also, management protocols may automatically configure security authentication parameters on recovery system 102 to manage virtualization platform 126 and VMs 128, such as allowing for an automatic failback process to initiate a live storage migration of any of the VMs 128 back to a production data store.

Moreover, system 100, by using a layered architecture, allows for each layer to be implemented independent of any other layer, and to be tested independently. Moreover, this layered architecture provides individual layers which may be used in other contexts, functions, processes, etc., within or outside of the recovery system 102.

3. Architectures for Native Access to Backup Data

It is beneficial to have the production environment virtualization platform or hypervisor (e.g., Hyper-V, VMware, etc.) to access the backup data in a format that is preferred by the particular hypervisor being used. In this way, such the hypervisor may perform storage migration of failover VMs to production storage, without downtime (i.e., while the VMs are running).

There are several different techniques to adapt the backup data (recovery points) "on-the-fly" so that time-intensive data conversion of the backup data is not needed, while allowing the hypervisor to immediately use what is perceived by the hypervisor as data in its native format.

3.1 Stub File/Plugin Approach

One approach to adapt the backup data "on-the-fly" is to create small VM definitions—for example ".vmx" (VMware—INI file), ".vmc" (XML), ".vmcx" (binary)—and VM storage files (e.g., VMDK, VHDX) on a native local filesystem to the hypervisor. In the place of full storage files, stub or plugin files may be created (e.g., a custom NTFS reparse point) and a filter driver may be installed that will recognize the stub/plugin file, and adapt reads to the full storage files to instead read from the backup recovery points instead.

There are advantages to this approach, including that the path to the VM storage files are deterministic (the path does not change across system reboots) and appear to the hypervisor as if they are on the same data volume as the local storage. Also, translations for a given stub/plugin file are fairly simple to map to data for a given recovery point.

However, some disadvantages of this approach include the actual development of a custom filter driver, which is complex and requires interacting with a full filesystem driver in performance-sensitive ways. Also, installation of a device driver on the hypervisor carries a risk of crashing due to kernel panics, may have Microsoft Windows version compatibility challenges, makes software updates more difficult (often involving unwanted reboots), and only works if you can modify the kernel of the hypervisor's operating system. Moreover, this approach relies on special recognition by the filter driver that the backup application is authorized to write/update the stub/plugin file definition itself, as compared to other applications where file I/O is directed to the data it represents.

Typically the stub/plugin files exposed by the filter driver are read-only, and the hypervisor uses snapshot differencing files (e.g., AVHDX) to store changes for the files, which may complicate failback and ongoing operations (e.g., require one or more "flattening" operations later).

3.2 Virtual Filesystem Approach

Another approach to adapt the backup data "on-the-fly" is to use a device driver to provide an entire virtual filesystem, instead of virtualizing only stub/plugin files onto an existing local filesystem. The virtual filesystem would have a separate mount point drive letter than the drive letter for existing local storage. The advantages and disadvantages of this approach are similar to those for the stub/plugin approach, e.g., still requires device driver development, local kernel access, etc.

3.3 Virtual Block Device with Passthrough Disks Approach

In this approach, a virtualized block device may be provided to the virtualization platform that appears as one or more locally attached disks for the data volumes associated with the desired recovery point that is to be virtualized. This approach is in contrast to the previous approaches that provide what appears to the virtualization platform as a set of files (whether stub/plugin files or a virtual filesystem). The virtualized block device may present a plurality of virtual disks, each including data from the backup recovery points needed for the VM to be virtualized. The VMs are configured to use "passthrough disks" so that the VM will use what the virtualization platform believes are local disks as virtual disks for each particular VM.

The advantages of this approach include more low level control over critical operations (e.g., write cache flush), even in crash-stop scenarios, by virtualizing a SCSI block device. In other words, a user is able to safely implement its own copy-on-write layer, causing the recovery point to appear writeable, even though the underlying backup recovery point is read-only. This avoids the use of VM snapshots and/or differencing files (e.g., AVHDX). Also, translations for a given virtual block device are simple to map to data for a given recovery point.

The disadvantages to this approach include needing to develop a custom device driver, along with all of the challenges in implementing the custom device driver. Some virtualization platforms do not support live storage migration for VMs with passthrough disks. However, there is no other functionality available to provide live storage migration in this approach because of the passthrough environment. Therefore, this approach does not support live storage migration which is a very useful feature for backup data recovery.

3.4 Custom iSCSI Target with Passthrough Disks Approach

This approach is similar to the virtual block device with passthrough disks approach, except that instead of a device driver being used to expose one or more virtual block devices, a custom iSCSI target server is implemented to provide iSCSI targets representing the data for the volumes in the backup recovery points to be virtualized. iSCSI is an industry standard protocol that allows for disk devices to be attached over a network. iSCSI clients (referred to as "initiators") do not know what type of storage is behind an iSCSI disk (referred to as a "target"), only that the target is a certain size, and supports certain low-level disk operations (e.g., read, write, cache flush, etc.).

The advantages to this approach include that a custom device driver does not need to be developed and installed when using a system that has a built-in iSCSI initiator within its kernel (such as a Microsoft Windows system). Also, the custom iSCSI target server is able to run locally (in the same OS as the virtualization platform) and/or over a network, providing greater flexibility for the user (e.g., where there is no dedicated backup appliance it may run on the same host as the hypervisor, or in appliance-based use cases, this layer may be running on the appliance). The other advantages for the passthrough disk approach are also present when using the custom iSCSI target.

However, a disadvantage to this approach is that some virtualization platforms do not support live storage migration for VMs with passthrough disks, as described previously. In addition, a custom iSCSI target server is complex to develop as it implements all the requirements for the core SCSI standard for block devices, as well as the iSCSI network protocol itself.

3.5 Custom iSCSI Target Including a Synthesized Filesystem

This approach may be implemented in one or more embodiments described herein. It does not use stub/plugin files or a virtualized file system, does not require VMs to use passthrough disks, and does not require installation of any filter or device drivers. This approach provides the advantages of an iSCSI target-based approach, while also delivering storage to the virtualization platform in a way that is "native" to the virtualization platform and is compatible with live storage migration.

This approach uses a custom iSCSI target server (e.g., iSCSI target server 108 in FIG. 1) to deliver one or more block devices to the virtualization system (e.g., virtualization system 104). However, instead of the block device(s) being passed-through to one or more individual VMs (e.g., VMs 128) using passthrough disks, the virtualization system is instructed to mount the filesystem using its unmodified filesystem driver 124. The contents of the block device provided by the iSCSI target server 108 includes a "synthesized" filesystem (e.g., synthesized filesystem 112) in that the filesystem structures represented by the data in the block device(s) are dynamically generated on request and are not actually stored on disk.

The data in this synthesized filesystem, in an embodiment, may be presented in one or more storage files native to the hypervisor, e.g., VHDX files, VMDK files, Virtual Disk Image (VDI) files, Quick EMUlator (QEMU) copy-on-write (QCOW2) files, etc., on a one-to-one basis. In other words, a storage file is synthesized for each virtual disk for the reference system in the backup recovery point that is selected for recovery. In various embodiments, the VHDX/VMDK files may be static or dynamic. A static VHDX/VMDK file includes a fixed header and appears to include each block of data for the entire volume/disk. A dynamic VHDX/VMDK file includes a header plus an allocation bitmap and some form of a logical sector mapping, which describes which logical sectors contain data and maps logical sectors in the disk that do contain data to a location in the VMDK/VHDX file that includes the data for that logical sector.

The block device provided by the iSCSI target server includes a synthesized filesystem that is in a format suitable for the virtualization system and the virtualization platform (e.g., virtualization platform 126) hosted by the virtualization system. In an approach, the virtualization system is a hypervisor host using a particular type of hypervisor as the virtualization platform. The determination as to what a suitable format is may be based on the type of hypervisor used. In an example, for Hyper-V, a suitable format may be NTFS and/or Resilient Filesystem (ReFS). In another example, for VMware the suitable format may be VMFS. Thus, when the hypervisor host mounts the block device, it will appear to the hypervisor as if this storage is a real physical storage just like any other network storage it would natively mount, format, and use for storing data for VMs in the native format.

The synthesized filesystem included in the block device exposed by the custom iSCSI target server is a read-only view into the corresponding data. A copy-on-write layer (e.g., copy-on-write layer 110), in some embodiments, may be configured above the synthesized filesystem to allow this read-only block device to have read and write capabilities. In an embodiment, all write requests to the block device may be stored in blocks on one or more storage devices accessible to the iSCSI target server, with a granularity of copy-on-write blocks being selected by the system to match a block size of the underlying synthesized filesystem (e.g., 4 KB, 64 KB, 128 KB, etc.). The copy-on-write layer remembers which logical sectors of the block device have been written, and if a read is requested from a block that was previously written, it will fetch the data from the copy-on-write storage instead of the underlying read-only block device.

From a practical standpoint in a Hyper-V recovery environment without a local appliance, the recovery process or "wizard", including the custom iSCSI target server, logically resides on a Microsoft Windows host providing Hyper-V services, and an iSCSI attached virtual NTFS volume including VHDX files is possible to implement. For a VMware recovery environment without a local appliance, a separate device may be provided to execute the recovery process, since the block device is not able to be installed natively on VMware in some instances. In an approach, the recovery process may be embedded in a LiveCD running Linux and provide the VMware-based hypervisor with an iSCSI target including a virtual VMFS filesystem that includes VMDK files. For appliance-based recovery, the storage may be provided by the appliance, and the appliance may also be running the recovery process, including the custom iSCSI target server, which could provide iSCSI targets with NTFS/VHDX (for Hyper-V) and VMFS/VMDK (for VMware) upon request based on what is configured during a recovery operation.

The advantages of using a custom iSCSI target that includes a synthesized filesystem are numerous. The hypervisor OS does not need anything to be installed or modified in any way: no device drivers, filter drivers, plugins, etc. This allows for easy installation and fully automatic software updates from the vendor(s). The hypervisor is using what appears to be block storage in its preferred native filesystem format, which further includes VM storage files in its native preferred format. This native filesystem is modifiable, so that VMs are configured to write changes directly to the filesystem without relying on VM snapshots/differencing.

The custom iSCSI target server is configured to run locally (in the same OS as the virtualization platform or hypervisor), over a network, or in a distributed manner, which provides greater flexibility for the user (e.g., if there is no appliance, the custom iSCSI target server runs on the same host system as the hypervisor, whereas in an appliance-based environment the custom iSCSI target server runs on the appliance, etc.).

By virtualizing the SCSI block device, more low level control over critical operations (e.g., write cache flush) is achieved, and the configuration is able to ensure that the block device is implemented properly even in crash-stop scenarios. Therefore, the user may safely implement a copy-on-write layer and expose the block device, which appears as a writeable device.

The only disadvantages to using a custom iSCSI target server are the complex implementation of the custom iSCSI target server and the many layers that are used to setup custom targets. For example, as shown in FIG. 1: a copy-on-write layer 110, a synthesized filesystem 112 (with all internal filesystem data structures populated correctly), one or more VHDX/VMDK emulation layers 114 (mapping raw partition or raw disk data as a static or dynamic VHDX/VMDK file), and one or more virtual disk layers 116 to emulate raw partition/disk data from one or more backup recovery point block translation layers 118 with data stored in a proprietary backup format from the backup filesystem 120.

The image backup data may be stored on filesystem 120, and/or be acquired from a variety of other sources. In an example, the data may be acquired from a network API service (e.g., REST) being served by a source, such as a cloud service, a local backup appliance, etc. If the data is acquired from a network service, in an embodiment, a locally stored memory and/or on-disk cache may be used to store frequently or recently retrieved blocks. In another embodiment, the data may be served by one of or a combination of a recovery point index and a deduplicated block store, with block data being stored on a local filesystem, a network filesystem, and/or a network-based object storage system.

4. Example Embodiments

4.1 Initiating a Restore Operation

Figure 3:
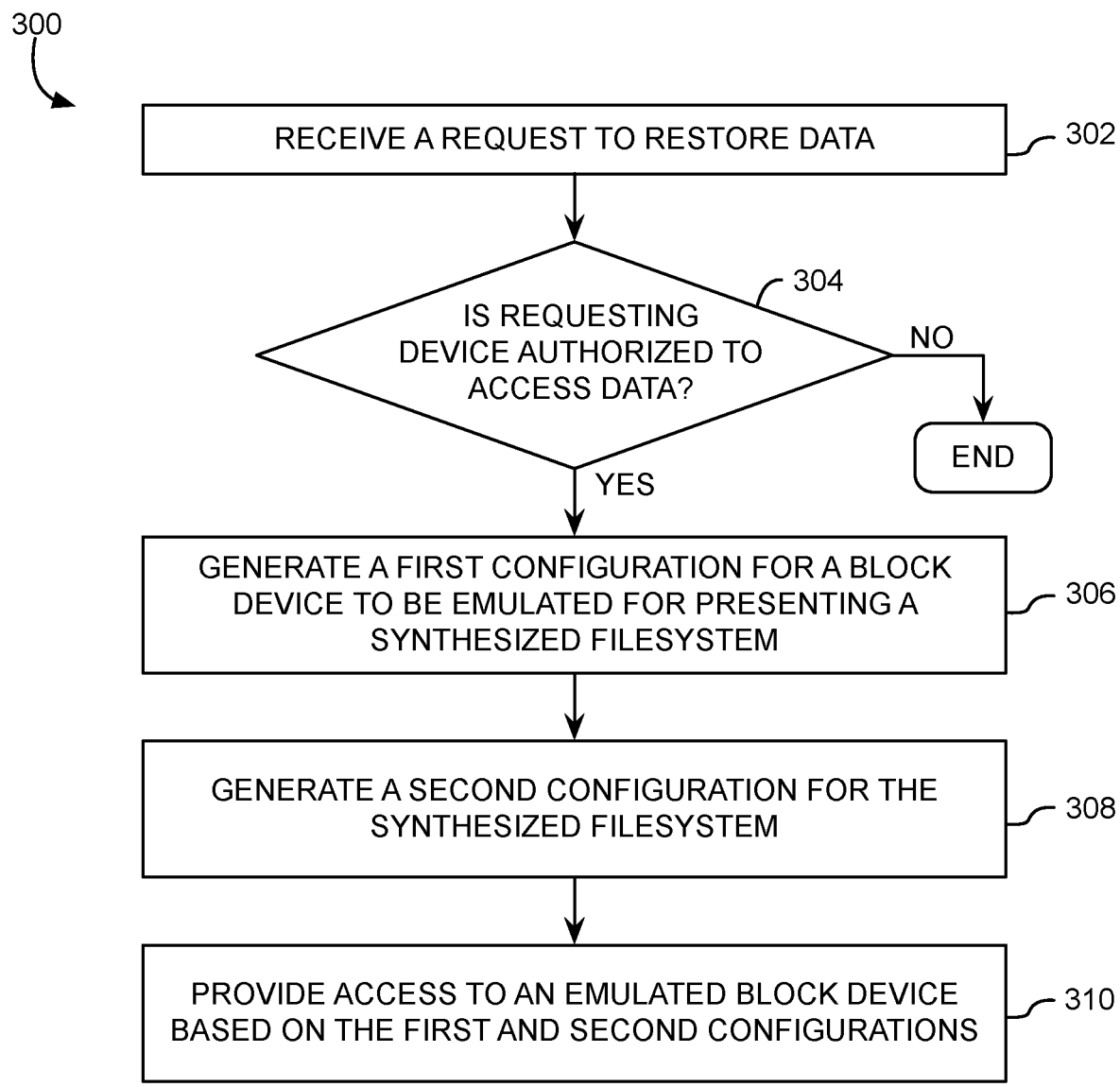
FIG. 3 is a flow diagram of an example method for initiating a restore operation to retrieve backup data for a reference system.

FIG. 3 is flow diagram of an example method 300 for initiating a restore operation to retrieve backup data for a reference system. One or more operations illustrated in FIG. 3 may be modified, rearranged, or omitted all together. Accordingly, the particular sequence of operations illustrated in FIG. 3 should not be construed as limiting the scope of one or more embodiments. In one embodiment, method 300 may be executed by a hardware appliance, a server device, or a system configured to create and manage backup data for a reference system. For the remainder of the descriptions of FIG. 3, method 300 will be described as being performed by a computing system.

In operation 302, the computing system receives a request to restore data for a system (such as backup data for a protected system, snapshot data for a point-in-time to duplicate configuration and operations of a reference system, initialization and configuration image data to initialize or restart a system fresh, etc.). The request may be received directly from a requesting system or device, via a wireless or physical network, included in a transmission having a different purpose or target, forwarded from another device or system, or in any other manner known in the art.

The request may be issued by any system, process, application, or entity. Moreover, the request may be verified by the computing system as being authorized and/or have permission to store and/or access backup data prior to performing any further operations of method 300.

In an approach, the request may have any format that is compatible with the computing system, or that may be processed and/or read by the computing system in order to determine a purpose of the request (e.g., retrieve backup data, store data, delete data, modify data, change stored data, etc.).

In one embodiment, the request may include a particular file system format that indicates a file system format of the reference system for which the backup data will be retrieved, or the file system format most compatible with the hypervisor on the virtualization system. In cases where the request does not include the particular file system format, the computing system may determine the particular file system format using some other technique. For example, a user may be prompted to input the particular file system format, the particular file system format may analyze the reference system and/or logical structures thereof and/or properties of the virtualization system to make the determination, etc.

In an embodiment, the request may include a particular virtual disk format that indicates a virtual disk format compatible with the hypervisor on the virtualization system. In cases where the request does not include the particular virtual disk format, the particular file system format may determine the particular virtual disk format using some other technique. For example, a user may be prompted to input the particular virtual disk format, the particular file system format may analyze the reference system and/or logical structures thereof and/or properties of the virtualization system to make the determination, etc.

According to an embodiment, the request may include a recovery point that represents a particular point in time. This point in time indicates which backup data is to be retrieved, since many point-in-time snapshots or images of data may be created, identification of which point in time is to be retrieved is useful for retrieving the corresponding data. In cases where the request does not include the recovery point for backup data retrieval, the particular file system format may determine the recovery point using some other technique. For example, only one recovery point may exist negating the need to identify the particular point in time, an identifier or mark may be included in the request which corresponds to a particular point in time, a user may be prompted to select a particular point in time for backup data retrieval, the latest available point in time may be automatically chosen, some method may be used to find a latest available recovery point that is not likely to have security risks, corruption, etc.

In optional operation 304, the computing system may verify if the requesting system has authority to access the requested data prior to continuing with method 300. This verification process may include ensuring that presented credentials are valid (e.g., verifying that a presented JWT token is valid and authorizes the presenter to access the requested data, or any other technique for authentication and authorization known in the art), checking a device identifier of the requesting system against a list of authorized entities, determining if the request has an appropriate format and includes minimum information for processing the request (e.g., a file system format for data presentation, a virtual disk format for data presentation, and/or a recovery point representing a particular point in time for which data set to present to the requesting system).

In operation 306, the computing system generates a configuration of a block device to be emulated responsive and subsequent to receiving the request to restore the backup data (referred to as a "first configuration"). In other words, the request to restore the backup data may trigger generation of a block device target within a custom iSCSI target server, with the block device target not existing prior to receiving the request to restore the backup data, in one approach.

The block device is generated so that it may present the contents of a synthesized filesystem. The first configuration of the block device is based on: a) an amount of data in the recovery point, b) the particular file system format, and c) the particular virtual disk format, according to one embodiment. The computing system may determine the amount of data in the recovery point by analyzing the recovery point and generating either an estimate of or precisely calculating the amount of data in the recovery point (possibly after going through one or more transformations), the amount of data may be included as metadata in the recovery point, the amount of data may be provided by a user, or obtained by the computing system using some other technique. There could also be an additional amount of desired free space ("free space buffer") in the synthesized filesystem that is automatically calculated or is provided by a user. The amount of data in the recovery point plus the "free space buffer" is used to determine a total size of the block device that the computing system generates.

In an embodiment, the computing system generates the first configuration of the block device by determining a size of each block in the block device (which may be a fixed value in an approach, or a variable value in an alternate approach). Moreover, the computing system determines a total number of blocks that are included in the block device. A total size of the block device may be calculated by multiplying the total number of blocks by a given fixed size for each block (or an average size given the blocks are variable in size). When the computing system knows the total size needed to present the data in the recovery point plus the free space buffer, the size of each block in the block device and the total number of blocks that are included in the block device may be easily determined given the relationship described above.

In operation 308, the computing system generates a configuration for the synthesized filesystem (referred to as a "second configuration") responsive and subsequent to receiving the request to restore the backup data. In other words, the request to restore the backup data may trigger generation data structures and memory buffers or backing files comprising the synthesized filesystem, with the synthesized filesystem not existing prior to receiving the request to restore the backup data, in one approach.

In operation 310, the computing system, in response to the request to restore the backup data, provides access to an emulated block device which is based on the first configuration and the second configuration. The emulated block device is configured to represent a source of data that is recognizable and compatible with the virtualization system and/or reference system (or some other device requesting the backup data).

In one approach, the synthesized filesystem may include one or more virtual disk files. According to a first embodiment, the one or more virtual disk files may be configured as static files having a fixed header and entries for each block of data representing a volume or disk on the reference system. According to an alternate embodiment, the one or more virtual disk files may be configured as dynamic files that include an allocation bitmap and some form of a mapping of logical sectors of a volume or disk (correlated to respective offsets on the reference system) to locations where the data for such logical sectors are expected to be found within the virtual disk file(s). In addition, in either of these embodiments, the one or more virtual disk files may be formatted according to VHDX, VMDK, VDI, QCOW2, or some other established virtual disk formatting scheme.

According to an approach, the synthesized filesystem may be provided as an iSCSI target to a hypervisor system or other virtual layer structure acting as an initiator for retrieving backup data using iSCSI.

According to an embodiment, the computing system may configure a recovery system to access the emulated block device. This configuration may include setting and/or changing parameters, targets, gateways, addresses, authentication credentials, etc., in order to design the recovery system to be able to access and make use of the emulated block device to recover backup data therefrom.

In an embodiment, the computing system may obtain a first disk partition layout of the system from which the backup data was generated. From this information and/or the requested synthesized file system format, the computing system may generate a second disk partition layout for the emulated block device. In other words, the computing system may create the second disk partition layout so that the emulated block device has a valid partition table that will allow an unmodified file system driver to mount the data within the synthesized filesystem. For example, if the requested synthesized filesystem format is NTFS and the first partition layout indicates the total data size will be less than 2 TB, a second disk partition layout may be constructed using the "MBR" format. Alternatively, if the requested synthesized filesystem format is VMFS, a second disk partition layout may be constructed using the "GPT" format. The computing device may use the particular virtual disk format and/or the first disk partition layout to determine a configuration for a set of files to be included in the emulated block device. This configuration for a set of files includes metadata about each file, including its name, size, security descriptors, and other file properties as required by the particular file system format. In this way, the computing device can ensure that the virtualization system or the system from which the backup data was generated (or whatever device is requesting the backup data) is able to access the backup data in a format which it expects to receive the backup data, but without having to actually write all of the backup data in any particular format.

According to a further embodiment, the computing system may determine a configuration for the synthesized filesystem based on the set of files to be included in the emulated block device and the particular file system format. In addition, the computing system may generate filesystem metadata describing the synthesized filesystem in the particular file system format and the set of files to be included in the emulated block device. This filesystem metadata may be presented as part of certain blocks within the emulated block device to allow an unmodified filesystem driver to "mount" the synthesized filesystem included within the emulated block device and thus make available the files and their data within. The generated data for the filesystem metadata may be stored in data structures or memory sections in one approach, and/or may be stored or cached to some form of persistent storage (e.g., files on a local filesystem, objects within an object storage system), so that this data can be quickly retrieved on demand without costly calculations in the future.

The computing system may also generate a first mapping that correlates a first portion of blocks of the emulated block device to corresponding portions of the filesystem metadata. In other words, an index is created that indicates that certain logical blocks in the emulated block device correspond to certain portions of the previously generated filesystem metadata. In one embodiment, the first portion of blocks may comprise less than 1% of all blocks of the emulated block device. The first mapping, in an approach, may describe a relationship between one or more sets of the first portion of blocks and memory sections comprising the filesystem metadata.

According to another embodiment, the computing system may generate a set of transformations for converting the backup data to the data included within the set of files. These transformations are configured to produce data for particular regions of corresponding files in the set of files from respective particular portions of the backup data that are able to be readable by the reference system (or some other device that requested restoration of the backup data).

Moreover, in an embodiment, the computing system may generate a second mapping for a second portion of blocks of the emulated block device that describes a relationship between one or more sets of the second portion of blocks and a corresponding transformation from the set of transformations. This second mapping indicates the particular transformation that is to be used to transform corresponding data in the data region of the emulated block device to make the user data ready for presentation to the requesting device.

In order to restore backup data for the reference system, the computing system may receive at least a portion of the backup data that represents an image-based backup (e.g., a snapshot of the data of the reference system taken at a particular point-in-time) of the system to fulfill at least a portion of a given transformation from the set of transformations. Once this image-based backup is received, the computing system may transform the image-based backup data into another format capable of being restored to the requesting device. For example, the image-based backup data may be stored on a local filesystem, and may be read on demand from the local filesystem. Alternatively, the image-based backup data may be stored in a cloud system, and may be retrieved and/or received on demand by making API calls to the cloud system, etc.

In one embodiment, the computing system may generate and manage a third mapping that correlates changes received after generating the first mapping ("post-write changes"). This third mapping is consulted by the computing system, if it exists, prior to checking the first mapping whenever a read request for data in the emulated block device is received, to ensure that the most up-to-date data is accessed and returned to the requesting device.

After the first request is received in operation 302, the computing system may receive a second request. The second request may be processed by the computing system to determine that the second request will modify one or more data blocks of the emulated block device. In various embodiments, the second request may cause additional data to be written in the emulated block device, it may cause data to be deleted from the emulated block device, and/or it may cause existing data to be changed on the emulated block device.

In response to this second request, and in response to the modifications made to the data of the emulated block device, the computing system modifies the third mapping to describe any changes that are made to the emulated block device based on the second request. The changes noted in the third mapping are not reflected in the first mapping, as the changes described by the third mapping occur after the first mapping is created. Moreover, the first mapping is not changed to reflect the modifications to the data of the emulated block device once it is created.

4.2 Providing Data to a System Using an Emulated Block Device

Figure 4:
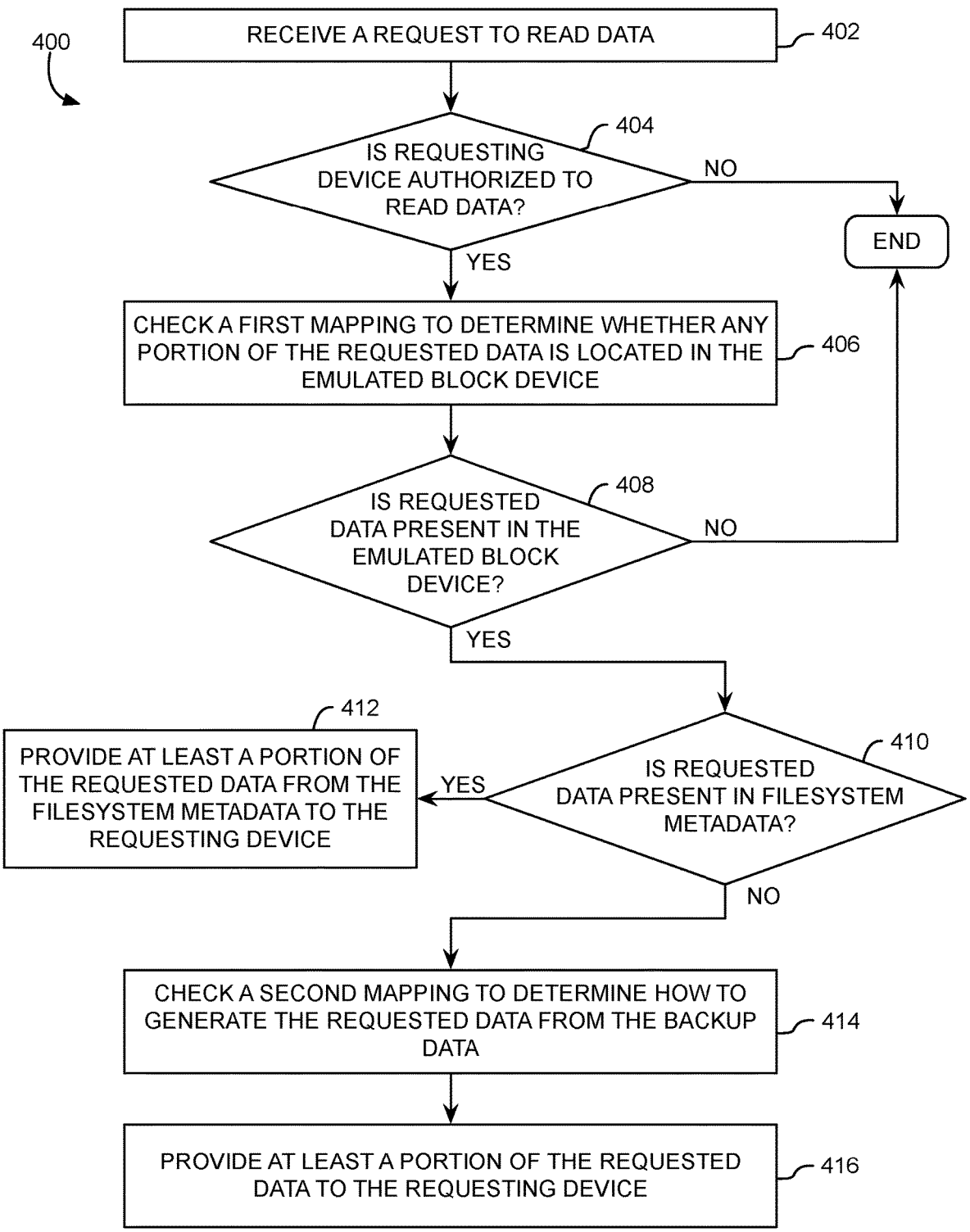
FIG. 4 is a flow diagram of an example method for providing data to a system using an emulated block device.

FIG. 4 is flow diagram of an example method 400 for providing data to a system using an emulated block device.

One or more operations illustrated in FIG. 4 may be modified, rearranged, or omitted all together. Accordingly, the particular sequence of operations illustrated in FIG. 4 should not be construed as limiting the scope of one or more embodiments. In one embodiment, method 400 may be executed by a hardware appliance, a server device, or a system configured to manage backup data for a reference system. For the remainder of the descriptions of FIG. 4, method 400 will be described as being performed by a computing system.

In operation 402, the computing system receives a request, such as from a system configured to restore backup data, to read a first dataset from an emulated block device. The emulated block device may be provided to one or more entities for access to data stored therein, such as backup data of the reference system. The request may be received directly from a requesting system or device, via a wireless or physical network, included in a separate transmission, forwarded from another device or system, or in any other manner known in the art.

The request may be issued by any system, process, application, or entity. In an approach, the request may have any format that is compatible with the computing system, or that may be processed and/or read by the computing system in order to determine a purpose of the request (e.g., retrieve backup data, store data, delete data, modify data, change stored data, flush pending modifications to stable storage, etc.).

In optional operation 404, the computing system may verify if the requesting system has authority to read the requested data prior to continuing with method 400.

The request may be verified by the computing system as being authentic, and being issued by a system/device which is authorized and/or has permission to at least read data of the emulated block device prior to performing any further operations of method 400. This verification process may include validating that the session associated with the request has been previously secured and validated, e.g., that an iSCSI session presented valid credentials and were verified through the challenge handshake authentication protocol (CHAP), checking that presented credentials included with the request are valid (e.g., verifying that a presented JWT token is valid and authorizes the presenter to access the requested data, or any other technique for authentication and authorization known in the art), checking a device identifier of the requesting system against a list of authorized entities, determining if the request has an appropriate format and includes minimum information for processing the request, etc.

In operation 406, in response to receiving the request, the computing system checks a first mapping to determine whether at least a first data block of the first dataset is located in the emulated block device. In an embodiment, the first mapping describes relationships between a first portion of blocks of the emulated block device and memory sections comprising filesystem metadata describing the first portion of blocks. One or more additional data blocks of the first dataset and/or other datasets that have been requested may be searched in the first mapping, in subsequent operations.

By checking the first mapping, the computing system is able to determine whether the requested data is present in the emulated data block device in filesystem metadata thereof. If filesystem metadata exists describing the requested data, then the computing system is able to determine that the requested data is located in the emulated block device (e.g., the requested data is present in the emulated block device). Moreover, the computing device is further able to determine, from checking the first mapping, whether or not the requested data is available to be immediately satisfied by obtaining a certain portion of the filesystem metadata corresponding to the requested data.

Filesystem metadata describes other data (e.g., user data) of the emulated block device, using a certain portion of the blocks of the emulated block device for storing the metadata. The first mapping provides information relevant to determining: 1) if the requested block has any valid data in the data of the emulated block device, and 2) if the data of the requested block is represented by a certain portion of the filesystem metadata stored in the memory sections (or some other location).

If checking the first mapping in operation 408 reveals that the requested data is not present in the emulated block device, method 400 ends by returning an appropriate error response to the requestor.

If the first mapping indicates that there is valid data for the requested data block as determined in operation 408, and the data is available in the filesystem metadata as determined in operation 410, then the request for that requested data block may be satisfied by providing a portion of the filesystem metadata in operation 412. The portion of the filesystem metadata that includes the requested data block is indicated by the first mapping. Moreover, the first mapping may also describe how to provide the data for the first data block (e.g., a "third configuration") responsive to the requested data being available in the filesystem metadata. Therefore, the portion of the filesystem metadata provided in operation 412 may be subjected to one or more conversions specified in the third configuration, which may be ascertained from the first mapping, the second mapping, or some other resource.

If the first mapping indicates that there is valid data for the requested data block, and the data is not available in the filesystem metadata as determined in operation 410, then method 400 continues to operation 414 to check a second mapping in an attempt to locate the requested data from the emulated block device.

In operation 414, the computing system checks a second mapping to determine how to generate the first data block stored in the emulated block device. The second mapping describes how to provide data for the second set of data blocks of the emulated block device. The data for the first mapping is provided by the filesystem metadata. When a check of the first mapping does not reveal that the requested data is in the filesystem metadata, then the second mapping may be checked.

In particular, the second mapping describes a second portion of data blocks of the emulated block device that may be generated by applying certain transformations and/or conversions to the backup data. If the second mapping does not include an entry for the requested data, then an "empty value" for the requested data block (e.g., all zeros) may be returned, as there is not a non-zero value associated with the requested data block.

When the computing system checks the first mapping and/or the second mapping, a configuration for presentation of the first data block stored in the emulated block device (referred to as the "third configuration") may be determined. The third configuration provides information about how to present the first data block (and any further data blocks retrieved in response to the request) to the requesting device, such as any memory sections or other data sources to retrieve the data from, transformation to be applied, etc., such that the requested data may be presented to the requesting device in a manner which is understandable and antici-pated by the requesting device (e.g., a fixed-size sequence of bytes for each requested data block).

In operation 416, at least a portion of the requested data (e.g., the first data block) is provided to the requesting device in accordance with the third configuration and one or more corresponding transformations. The corresponding transformations allow for the first data block to be understood by the requesting device (e.g., presented in a manner expected by and compatibly with the requesting device).

In further response to receiving the request, according to an embodiment, the computing system may check the first and/or second mapping to determine whether a second data block of the first dataset is located in the emulated block device and how to present the second data block to the requesting device. Responsive to determining that the second data block is located in the emulated block device based on checking the first mapping, the computing system either provides the second data block from the filesystem in accordance with a configuration (referred to herein as "fourth configuration") determined from the first mapping, or checks the second mapping to determine a second location of the second data block stored in the emulated block device and the fourth configuration for presentation of the second data block stored in the emulated block device. In addition, the second data block may be provided to the requesting device in accordance with the fourth configuration and one or more corresponding transformations when providing the first dataset.

According to an approach, the first dataset is provided in real time responsive to receiving the second request, in part due to pre-configuring the emulated block device to provide data on demand based on one or more configurations of the reference system.

In one embodiment, the computing system may generate and manage a third mapping that correlates changes received after generating the first mapping ("post-write changes"). This third mapping is consulted by the computing system, if it exists, prior to checking the first mapping whenever a read request for data in the emulated block device is received, to ensure that the most up-to-date data is accessed and returned to the requesting device. The third mapping describes changes made to data of the emulated block device after generation of the first mapping (e.g., post-write changes).

In an embodiment, the computing system checks the third mapping for post-write changes to the emulated block device prior to checking the first mapping, to determine if any changes have been made to the requested data. Upon determining that the requested data (or a portion thereof) is listed in the third mapping, the computing system utilizes the previously recorded data changes in the third mapping to rectify any portion of the requested data to be up-to-date based on the change record, prior to providing the requested data to the requesting device. If the third mapping indicates that a certain portion of data has not changed, the request for the unmodified portion of data is handled the same as before in method 400.

4.3 Local Virtualization with Failback to Local Production

According to an example, a production environment that is not backing up using a backup appliance ("Direct-to-Cloud," or "D2C") may have local virtualization provided by a recovery system. Also, the data for one or more servers may be backed up directly to remote storage (e.g., cloud storage) as well as to one or more local storage devices. To perform a recovery, an MSP installs a recovery client application within the production environment (e.g., on a recovery system or alternatively one of the other stilloperational systems in the production environment), and starts a recovery process for at least one previously backed up system of the production environment to be restored.

In this example, the MSP may login in to the recovery client with their credentials, choose the customer they want to restore data for, choose the protected machine(s) to virtualize, point in time (which recovery point), and virtualization mode (test mode or production), indicate the directory location of the local cache, choose the directory where data written by VMs will be stored locally (copy on write storage location), and requests the recovery process to begin using this provided information.

From the MSP's perspective, within a few seconds, the recovery system performs the following steps: 1) downloads any metadata (e.g., volume block hashes) required to synthesize a recovery point block data using the local cache data, 2) configures an authorization token and other metadata to enable simulated storage and download of any missing data from the cloud, and starts a local service that provides the simulated storage, 3) does any physical-to-virtual (P2V) and/or virtual-to-virtual (V2V) work prior to booting, 4) configures the unmodified virtualization platform to connect to the simulated storage (including credentials needed to pass the iSCSI CHAP authentication protocol), 5) configures the unmodified filesystem driver on the virtualization platform to mount the synthesized filesystem in the simulated storage, 6) configures virtualization platform VM(s) with the desired CPU/RAM and with virtual disks backed by virtual machine disk files on the mounted synthesized filesystem (which provide the data in a format compatible with the hypervisor, such as VHDX), and 7) requests the hypervisor to start the VMs.

When in production mode, the VMs continue to backup to the remote storage, creating additional recovery points, and sending and storing only incremental changes. When the virtualization platform host is rebooted, the VMs automatically start (the simulated storage restarts in time to support the hypervisor starting the VMs without any user intervention). When the MSP is ready to failback to local production, the MSP uses the native features of the virtualization platform and thus follows a failback process particular to the type of virtualization platform being used (e.g., Hyper-V storage migration).

4.4 Hyper-V Failback Approach

In this approach, Hyper-V VMs are running locally, on top of simulated storage (the Hyper-V host connects to simulated storage with its built-in iSCSI initiator to the custom iSCSI target server also running on the same Hyper-V host, and the simulated NTFS volumes that provide VHDX files, one per virtual disk in an embodiment). Hyper-V storage migration may be used from the Hyper-V GUI to transition a VM's storage from the synthesized filesystem to any normal production storage used by the Hyper-V system or Hyper-V cluster, at the user's discretion, without requiring stopping or pausing the VM. For example, this new storage could be a Server Message Block (SMB) network share on a network attached storage (NAS) device or another production Hyper-V server, another local storage drive, a clustered shared volume, etc.

4.5 VMware Failback Approach

In this approach, the recovery client may be installed onto another device on the network other than the VMware hypervisor host device(s). The user provides vSphere host or cluster credentials to the recovery client. The synthesized filesystem may be a VMFS filesystem containing VMDK files exposed by a custom iSCSI target server running on the recovery device, and the VMware host or vSphere cluster would then be configured to mount this iSCSI target as a native VMware data store. With this approach, the VMs would appear to be running on just another VMFS data store, and the user may use the VMware live storage migration functionality to migrate the storage for the VM to a production datastore.

To enable a clear understanding of the technological concepts described herein, the particular methods described herein include specific operations, which may be performed in a specific order, or one or more of the operations of a particular method may be rearranged and/or omitted while remaining within the contemplated scope of the technology disclosed herein. Moreover, different methods, and/or operations thereof, may be combined, rearranged, omitted, and/or executed in parallel to create different methods that are also within the contemplated scope of the technology disclosed herein. Additionally, while the methods described herein may omit or briefly summarize some of the details of the technologies disclosed herein for clarity, any details described in any of the paragraphs herein may be combined with the described operations to provide a more comprehensive understanding of these methods and related technologies.

5. Miscellaneous; Extensions

Embodiments are directed to a system with one or more devices that include a hardware processor and that are configured to perform any of the operations described herein and/or recited in any of the claims below. In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. Hardware Overview

According to one embodiment, the techniques described herein are implemented by one or more special-purpose computing devices (i.e., computing devices specially configured to perform certain functionality). The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
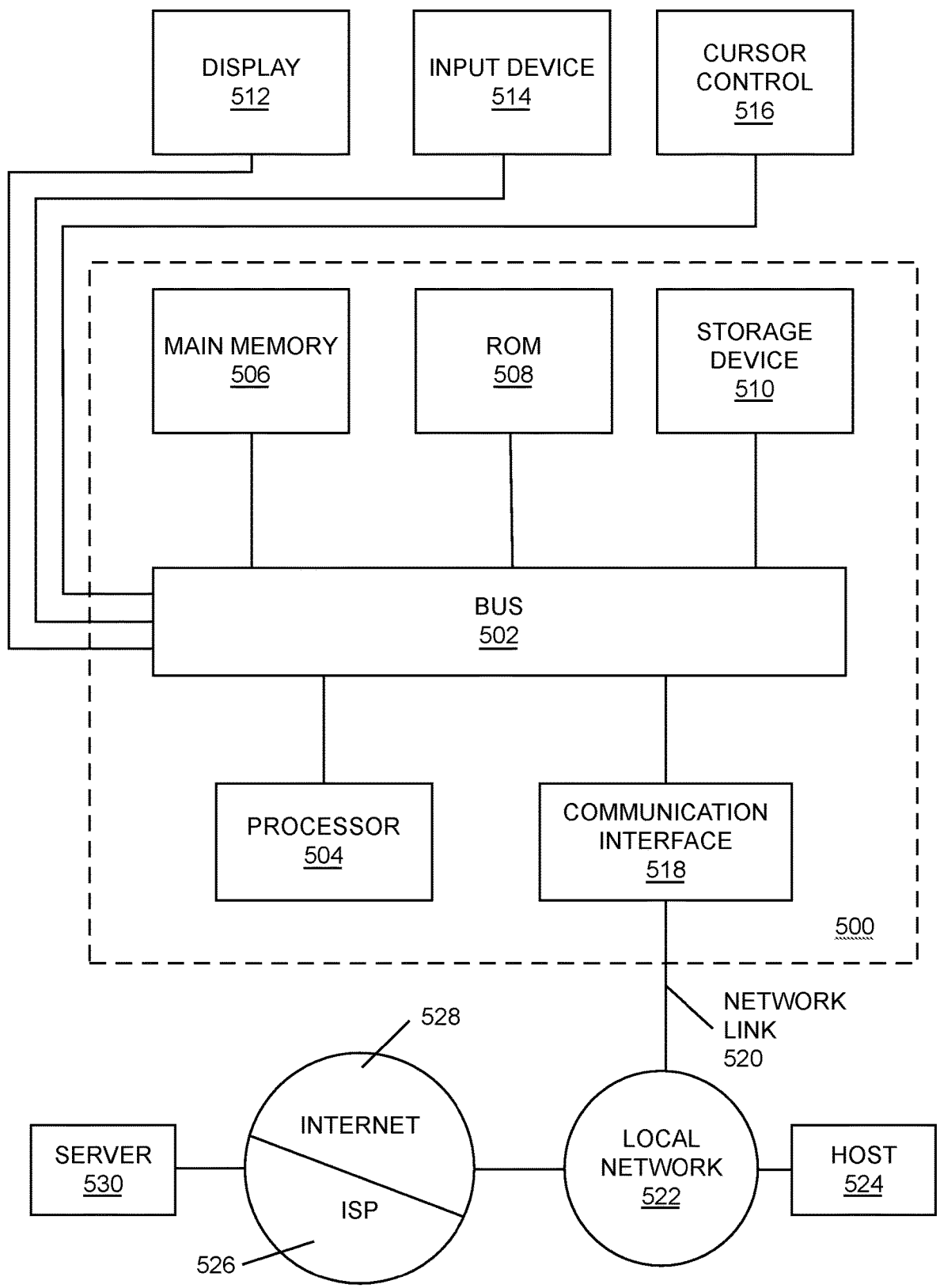
FIG. 5 shows a block diagram of an example computing system that may implement the features and processes of FIGS. 1-4.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or solid state disk, is provided and coupled to bus 502 for storing information and instructions.

Computer system 500 may be coupled via bus 502 to a display 512, such as a liquid crystal display (LCD), plasma display, electronic ink display, cathode ray tube (CRT) monitor, or any other kind of device for displaying information to a computer user. An input device 514, including alphanumeric and other keys, may be coupled to bus 502 for communicating information and command selections to processor 504. Alternatively or in addition, the computer system 500 may receive user input via a cursor control 516, such as a mouse, a trackball, a trackpad, a touchscreen, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. The display 512 may be configured to receive user input via one or more pressure-sensitive sensors, multi-touch sensors, and/or gesture sensors. Alternatively or in addition, the computer system 500 may receive user input via a microphone, video camera, and/or some other kind of user input device (not shown).

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, solid-state or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a programmable read-only memory (PROM), and erasable PROM (EPROM), a FLASH-EPROM, non-volatile random-access memory (NVRAM), any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a network, via a network interface controller (NIC), such as an Ethernet controller or Wi-Fi controller. A NIC local to computer system 500 can receive the data from the network and place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution.

7. Computer Networks and Cloud Networks

In one or more embodiments, a computer network provides connectivity among a set of nodes running software that utilizes techniques as described herein. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be any physical resource that provides compute power to perform a task, such as one that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, one tenant (through operation, tenant-specific practices, employees, and/or identification to the external world) may be separate from another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

Variations of the disclosed embodiments are also possible, and the explicit description thereof in this document is not required in order to provide a person having ordinary skill in the art with the ability to conceive of such variations when reading the present descriptions.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for initiating a restore operation, the method comprising:
   receiving a request to restore backup data for a system, the request indicating:
      a particular file system format;
      a particular virtual disk format; and
      a recovery point representing a particular point in time;
   responsive and subsequent to receiving the request to restore the backup data:
      generating a first configuration for a new emulation of a block device for presenting a synthesized filesystem, the first configuration being based on: a) an amount of data in the recovery point, b) the particular file system format, and c) the particular virtual disk format;
      generating a second configuration for creating the synthesized filesystem; and
      providing access to the newly emulated block device, that presents the synthesized filesystem, based on the first configuration and the second configuration in response to the request to restore the backup data,
   wherein the method is executed by at least one device comprising a hardware processor.

2. The method as recited in claim 1, wherein generating the first configuration of the block device comprises determining a size of each block in the block device and the number of blocks included in the block device, wherein each block has a fixed size.

3. The method as recited in claim 1, further comprising configuring a recovery system to access the newly emulated block device.

4. The method as recited in claim 1, further comprising:
   obtaining a first disk partition layout of the system from which the backup data was generated;
   generating a second disk partition layout for the newly emulated block device based on: the first disk partition layout, the particular file system format, or both the first disk partition layout and the particular file system format; and
   determining a configuration for a set of files to be included in the newly emulated block device based on the particular virtual disk format, the first disk partition layout, or both the particular virtual disk format and the first disk partition layout.

5. The method as recited in claim 4, further comprising:
determining a configuration for the synthesized filesystem based on the set of files to be included in the newly emulated block device and the particular file system format; and
generating filesystem metadata describing the synthesized filesystem in the particular file system format and the set of files to be included in the newly emulated block device.

6. The method as recited in claim 5, further comprising:
generating a first mapping for a first portion of blocks of the newly emulated block device, the first mapping describing a relationship between one or more sets of the first portion of blocks and memory sections comprising the filesystem metadata.

7. The method as recited in claim 6, further comprising:
generating a set of transformations for converting the backup data to the set of files, each transformation being configured to produce data for a particular region of a corresponding file in the set of files from a particular portion of the backup data; and
generating a second mapping for a second portion of blocks of the newly emulated block device, the second mapping describing a relationship between one or more sets of the second portion of blocks and a corresponding transformation from the set of transformations.

8. The method as recited in claim 7, further comprising:
receiving a portion of the backup data representing an image-based backup of the system to fulfill at least a portion of a given transformation from the set of transformations.

9. The method as recited in claim 1, further comprising:
receiving a second request that will modify one or more data blocks of the newly emulated block device; and
modifying a mapping to describe changes made to the newly emulated block device based on the second request.

10. The method of claim 1, further comprising:
receiving a second request to read a first dataset from the newly emulated block device, the first dataset comprising one or more data blocks;
in response to receiving the second request, checking a first mapping to determine whether a first data block of the first dataset is located in the newly emulated block device, the first mapping describing relationships between a first portion of blocks of the newly emulated block device and memory sections comprising filesystem metadata describing the first portion of blocks;
responsive to determining that the first data block is located in the newly emulated block device: checking a second mapping to determine a location of the first data block stored in the newly emulated block device and a third configuration for presentation of the first data block stored in the newly emulated block device, the second mapping describing relationships between a second portion of blocks of the newly emulated block device and corresponding transformations for converting data in the second portion of blocks into the first data block; and
providing the first data block in accordance with the third configuration and one or more corresponding transformations when providing the first dataset.

11. The method as recited in claim 10, further comprising:
in response to receiving the second request, checking the first mapping to determine whether a second data block of the first dataset is located in the newly emulated block device;
responsive to determining that the second data block is located in the newly emulated block device: checking the second mapping to determine a second location of the second data block stored in the newly emulated block device and a fourth configuration for presentation of the second data block stored in the newly emulated block device; and
providing the second data block in accordance with the fourth configuration and one or more corresponding second transformations when providing the first dataset.

12. The method as recited in claim 10, wherein the first dataset is provided in real time responsive to receiving the second request.

13. The method as recited in claim 10, further comprising checking a third mapping for post-write changes to the newly emulated block device prior to checking the first mapping, the third mapping describing changes made to data of the newly emulated block device after generation of the first mapping.

14. A system for initiating a restore operation, the system comprising:
one or more processors; and
a non-transitory computer-readable medium including instructions that, when executed by the one or more processors, causes the one or more processors to perform operations comprising:
receiving a request to restore backup data for a system, the request indicating:
a particular file system format;
a particular virtual disk format; and
a recovery point representing a particular point in time;
responsive and subsequent to receiving the request to restore the backup data:
generating a first configuration for a new emulation of a block device for presenting a synthesized filesystem, the first configuration being based on: a) an amount of data in the recovery point, b) the particular file system format, and c) the particular virtual disk format;
generating a second configuration for creating the synthesized filesystem; and
providing access to the newly emulated block device, that presents the synthesized filesystem, based on the first configuration and the second configuration in response to the request to restore the backup data.

15. The system as recited in claim 14, wherein the operations further comprise:
obtaining a first disk partition layout of the system from which the backup data was generated;
generating a second disk partition layout for the newly emulated block device based on the first disk partition layout and/or the particular file system format;
determining a configuration for a set of files to be included in the newly emulated block device based on the particular virtual disk format and/or the first disk partition layout;
determining a configuration for the synthesized filesystem based on the set of files to be included in the newly emulated block device and the particular file system format;
generating filesystem metadata describing the synthesized filesystem in the particular file system format and the set of files to be included in the newly emulated block device;

generating a first mapping for a first portion of blocks of the newly emulated block device, the first mapping describing a relationship between one or more sets of the first portion of blocks and memory sections comprising the filesystem metadata;

generating a set of transformations for converting the backup data to the set of files, each transformation being configured to produce data for a particular region of a corresponding file in the set of files from a particular portion of the backup data;

generating a second mapping for a second portion of blocks of the newly emulated block device, the second mapping describing a relationship between one or more sets of the second portion of blocks and a corresponding transformation from the set of transformations; and configuring a recovery system to access the newly emulated block device.

16. The system as recited in claim 14, wherein the operations further comprise:

receiving a second request that will modify one or more data blocks of the newly emulated block device; and modifying a mapping to describe changes made to the newly emulated block device based on the second request.

17. The system as recited in claim 14, wherein the operations further comprise:

receiving a second request to read a first dataset from the newly emulated block device, the first dataset comprising one or more data blocks;

in response to receiving the second request, checking a first mapping to determine whether a first data block of the first dataset is located in the newly emulated block device, the first mapping describing relationships between a first portion of blocks of the newly emulated block device and memory sections comprising filesystem metadata describing the first portion of blocks;

responsive to determining that the first data block is located in the newly emulated block device: checking a second mapping to determine a location of the first data block stored in the newly emulated block device and a third configuration for presentation of the first data block stored in the newly emulated block device, the second mapping describing relationships between a second portion of blocks of the newly emulated block device and corresponding transformations for converting data in the second portion of blocks into the first data block;

providing the first data block in accordance with the third configuration and one or more corresponding transformations when providing the first dataset;

in response to receiving the second request, checking the first mapping to determine whether a second data block of the first dataset is located in the newly emulated block device;

responsive to determining that the second data block is located in the newly emulated block device: checking the second mapping to determine a second location of the second data block stored in the newly emulated block device and a fourth configuration for presentation of the second data block stored in the newly emulated block device; and providing the second data block in accordance with the fourth configuration and one or more corresponding second transformations when providing the first dataset.

18. A non-transitory computer-readable medium including instructions that, when executed by one or more processors, causes the one or more processors to perform operations comprising:

receiving a request to restore backup data for a second system, the request indicating:
 a particular file system format;
 a particular virtual disk format; and
 a recovery point representing a particular point in time;

responsive and subsequent to receiving the request to restore the backup data:
 generating a first configuration for a new emulation of a block device for presenting a synthesized filesystem, the first configuration being based on: a) an amount of data in the recovery point, b) the particular file system format, and c) the particular virtual disk format;
 generating a second configuration for creating the synthesized filesystem; and
 providing access to the newly an emulated block device, that presents the synthesized filesystem, based on the first configuration and the second configuration in response to the request to restore the backup data.

19. The non-transitory computer-readable medium as recited in claim 18, wherein the operations further comprise:

obtaining a first disk partition layout of the system from which the backup data was generated;

generating a second disk partition layout for the newly emulated block device based on the first disk partition layout and/or the particular file system format;

determining a configuration for a set of files to be included in the newly emulated block device based on the particular virtual disk format and/or the first disk partition layout;

determining a configuration for the synthesized filesystem based on the set of files to be included in the newly emulated block device and the particular file system format;

generating filesystem metadata describing the synthesized filesystem in the particular file system format and the set of files to be included in the newly emulated block device;

generating a first mapping for a first portion of blocks of the newly emulated block device, the first mapping describing a relationship between one or more sets of the first portion of blocks and memory sections comprising the filesystem metadata;

generating a set of transformations for converting the backup data to the set of files, each transformation being configured to produce data for a particular region of a corresponding file in the set of files from a particular portion of the backup data;

generating a second mapping for a second portion of blocks of the newly emulated block device, the second mapping describing a relationship between one or more sets of the second portion of blocks and a corresponding transformation from the set of transformations; and configuring a recovery system to access the newly emulated block device.

20. The non-transitory computer-readable medium as recited in claim 18, wherein the operations further comprise:

receiving a second request to read a first dataset from the newly emulated block device, the first dataset comprising one or more data blocks;

in response to receiving the second request, checking a first mapping to determine whether a first data block of the first dataset is located in the newly emulated block device, the first mapping describing relationships between a first portion of blocks of the newly emulated block device and memory sections comprising filesystem metadata describing the first portion of blocks;

responsive to determining that the first data block is located in the newly emulated block device: checking a second mapping to determine a location of the first data block stored in the newly emulated block device and a third configuration for presentation of the first data block stored in the newly emulated block device, the second mapping describing relationships between a second portion of blocks of the newly emulated block device and corresponding transformations for converting data in the second portion of blocks into the first data block;

providing the first data block in accordance with the third configuration and one or more corresponding transformations when providing the first dataset;

in response to receiving the second request, checking the first mapping to determine whether a second data block of the first dataset is located in the newly emulated block device;

responsive to determining that the second data block is located in the newly emulated block device: checking the second mapping to determine a second location of the second data block stored in the newly emulated block device and a fourth configuration for presentation of the second data block stored in the newly emulated block device; and providing the second data block in accordance with the fourth configuration and one or more corresponding second transformations when providing the first dataset.

21. The method as recited in claim 1, further comprising:

receiving a second request to read a first dataset from the newly emulated block device, the first dataset comprising one or more data blocks;

in response to receiving the second request, determining a location of a first data block of the one or more data blocks stored in the newly emulated block device and a third configuration for presentation of the first data block stored in the newly emulated block device; and providing the first data block in accordance with the third configuration and one or more corresponding transformations when providing the first dataset.

\* \* \* \* \*